(12) United States Patent
Li et al.

(10) Patent No.: US 10,908,825 B2
(45) Date of Patent: Feb. 2, 2021

(54) SSD WITH PERSISTENT DRAM REGION FOR METADATA

(71) Applicant: Intel Corporation, Santa Clara, CA (US)

(72) Inventors: Peng Li, Beaverton, OR (US); Sanjeev Trika, Portland, OR (US); Jawad Khan, Portland, OR (US); Myron Loewen, Berthoud, CO (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 15/939,432

(22) Filed: Mar. 29, 2018

(65) Prior Publication Data

US 2019/0042113 A1 Feb. 7, 2019

(51) Int. Cl.
| G06F 3/06 | (2006.01) |
|---|---|
| G06F 1/26 | (2006.01) |
| G06F 1/30 | (2006.01) |
| G06F 12/0868 | (2016.01) |

(52) U.S. Cl.
CPC ............ *G06F 3/0619* (2013.01); *G06F 1/263* (2013.01); *G06F 1/30* (2013.01); *G06F 3/0647* (2013.01); *G06F 3/0685* (2013.01); *G06F 12/0868* (2013.01); *G06F 3/06* (2013.01)

(58) Field of Classification Search
CPC ...... G06F 3/0619; G06F 3/0647; G06F 1/263; G06F 1/30; G06F 3/0685
See application file for complete search history.

(56) References Cited

U.S. PATENT DOCUMENTS

| 9,448,922 | B2 | 9/2016 | Trika et al. | |
|---|---|---|---|---|
| 9,792,190 | B2* | 10/2017 | Kumar | .................. G06F 3/0685 |
| 2010/0202239 | A1* | 8/2010 | Moshayedi | ............ G11C 5/141 |
| | | | | 365/229 |
| 2014/0310533 | A1* | 10/2014 | Shionoiri | .................. G06F 1/00 |
| | | | | 713/192 |
| 2015/0261674 | A1* | 9/2015 | Wei | ...................... G06F 12/0866 |
| | | | | 711/135 |
| 2016/0054942 | A1* | 2/2016 | Yu | .......................... G11C 29/52 |
| | | | | 714/718 |
| 2016/0259726 | A1* | 9/2016 | Ide | ............................. G06F 3/06 |
| 2016/0378623 | A1* | 12/2016 | Kumar | .................. G06F 3/0685 |
| | | | | 714/3 |
| 2017/0060436 | A1 | 3/2017 | Trika et al. | |
| 2017/0091042 | A1* | 3/2017 | Chou | .................. G06F 12/0804 |
| 2017/0123702 | A1* | 5/2017 | Nguyen | .................. G06F 1/266 |
| 2018/0024768 | A1* | 1/2018 | Nguyen | .................. G06F 12/16 |
| | | | | 711/103 |

OTHER PUBLICATIONS

Extended European Search Report for European Patent Application No. 19160067.5, dated Aug. 2, 2019, 10 pages.
"Power loss imminent (PLI) technology", retrieved from intel.com/content/dam/www/public/us/en/documents/technology-briefs/ssd-power-loss-imminent-technology-brief.pdf, 8 pages.

* cited by examiner

*Primary Examiner* — Francisco A Grullon
(74) *Attorney, Agent, or Firm* — Jordan IP Law, LLC

(57) ABSTRACT

An embodiment of a semiconductor apparatus may include technology to determine a persistent region and a non-persistent region of a volatile media based on an amount of power available from one or more backup power sources, and periodically backup only the non-persistent region of the volatile media to a non-volatile media. Other embodiments are disclosed and claimed.

25 Claims, 7 Drawing Sheets

SSD WITH PERSISTENT DRAM REGION FOR METADATA

TECHNICAL FIELD

Embodiments generally relate to storage systems. More particularly, embodiments relate to a solid state drive (SSD) with a persistent dynamic random access memory (DRAM) region for metadata.

BACKGROUND

Some SSDs may include a NAND array for data storage and may maintain state information in DRAM. Some SSDs may include a NAND array for data storage and may maintain state information in non-volatile phase change memory (PCM). Some SSDs may include POWER LOSS IMMINENT (PLI) technology with energy storing capacitors. The energy storing capacitors may provide enough energy (power) to complete any commands in progress and to make sure that any data in the temporary buffers is committed to the non-volatile NAND media. The capacitors may act as backup batteries for the SSD.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation non-volatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level PCM, a resistive memory, nanowire memory, ferroelectric transistor random access memory (FeTRAM), anti-ferroelectric memory, magnetoresistive random access memory (MRAIVI) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
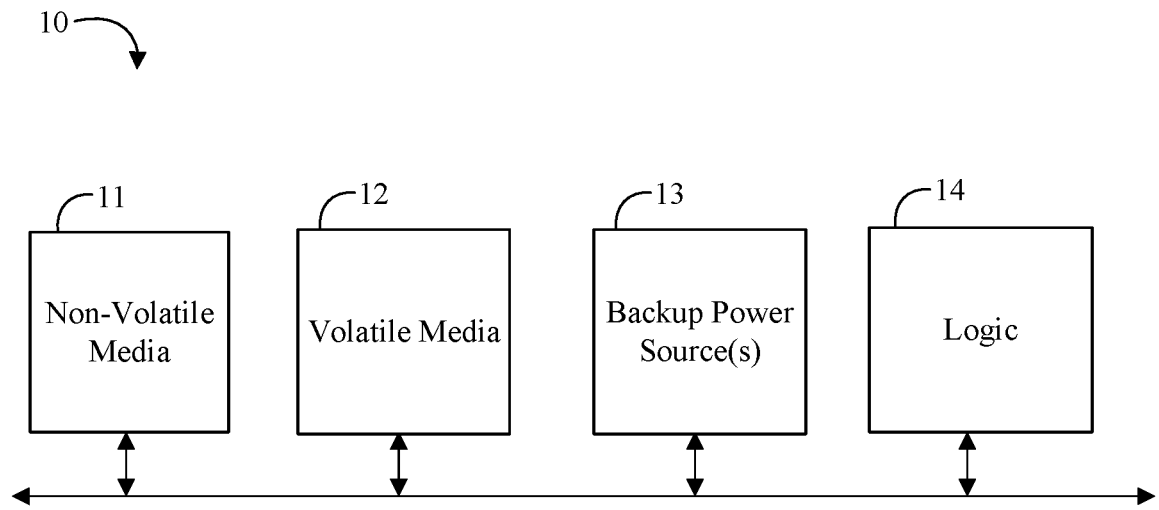
FIG. 1 is a block diagram of an example of an electronic processing system according to an embodiment.

Turning now to FIG. 1, an embodiment of a storage system 10 may include non-volatile media 11, volatile media 12, one or more backup power sources 13 communicatively coupled to the non-volatile media 11 and the volatile media 12, and logic 14 communicatively coupled to the non-volatile media 11, the volatile media 12, and the one or more backup power sources 13 to determine a persistent region and a non-persistent region of the volatile media 12 based on an amount of power available from the one or more backup power sources 13, and periodically backup only the non-persistent region of the volatile media 12 to the non-volatile media 11. In some embodiments, the logic 14 may be further configured to determine capacity information related to the amount of power available from the one or more backup power sources 13, and determine the persistent region and the non-persistent region of the volatile media 12 based on the capacity information. For example, the logic 14 may also be configured to determine the capacity information based on information from an external source (e.g., a host system).

In some embodiments of the system 10, the logic 14 may be further configured to store a portion of metadata in the persistent region of the volatile media 12. For example, the logic 14 may be configured to backup the stored metadata from the persistent region of the volatile media 12 to the non-volatile media 11 based on an indication of a power transition (e.g., a shutdown, an unexpected power loss, etc.). In some embodiments, the logic 14 may also be configured to select the portion of metadata to store in the persistent region of the volatile media 12 based on metadata priority information. For example, the logic 14 may also be configured to provide information to an external source (e.g., to a host system) related to one or more of the determined amount of power available from the one or more backup power sources 13, the persistent region of the volatile media 12, the metadata stored in the persistent region of the volatile media 12, and the metadata priority information. For example, the one or more backup power sources 13 may include one or more of an internal backup power source and an external backup power source. In some embodiments, the logic 14 may be located in, or co-located with, various components, including a processor, micro-controller, storage controller, etc. (e.g., on a same die).

Embodiments of each of the above non-volatile media 11, volatile media 12, backup power source(s) 13, logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the non-volatile media 11, volatile media 12, other persistent storage media, or other system memory may store a set of instructions which when executed by a processor, micro-controller, storage controller, etc., cause the system 10 to implement one or more components, features, or aspects of the system 10 (e.g., the logic 14, determining the persistent region and the non-persistent region of the volatile media based on an amount of power available from the one or more backup power sources, periodically backing up only the non-persistent region of the volatile media to the non-volatile media, etc.).

Figure 2:
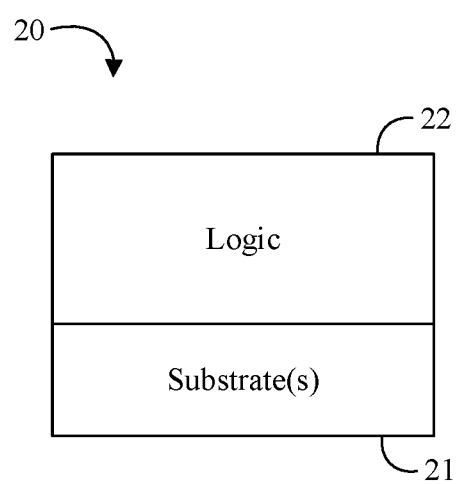
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine a persistent region and a non-persistent region of a volatile media based on an amount of power available from one or more backup power sources, and periodically backup only the non-persistent region of the volatile media to a non-volatile media. In some embodiments, the logic 22 may be further configured to determine capacity information related to the amount of power available from the one or more backup power sources, and determine the persistent region and the non-persistent region of the volatile media based on the capacity information. For example, the logic 22 may also be configured to determine the capacity information based on information from an external source (e.g., a host system).

In some embodiments of the apparatus 20, the logic 22 may be further configured to store a portion of metadata in the persistent region of the volatile media. For example, the logic 22 may be configured to backup the stored metadata from the persistent region of the volatile media to the non-volatile media based on an indication of a power transition (e.g., a shutdown, an unexpected power loss, etc.). In some embodiments, the logic 22 may also be configured to select the portion of metadata to store in the persistent region of the volatile media based on metadata priority information. For example, the logic 22 may also be configured to provide information to an external source (e.g., to a host system) related to one or more of the determined amount of power available from the one or more backup power sources, the persistent region of the volatile media, the metadata stored in the persistent region of the volatile media, and the metadata priority information. For example, the one or more backup power sources may include one or more of an internal backup power source and an external backup power source. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 25 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
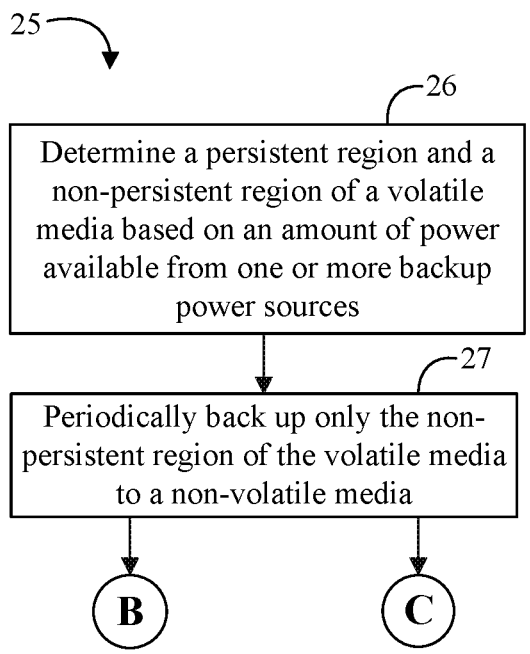
FIGS. 3A to 3C are flowcharts of an example of a method of controlling storage according to an embodiment.
Figure 3B:
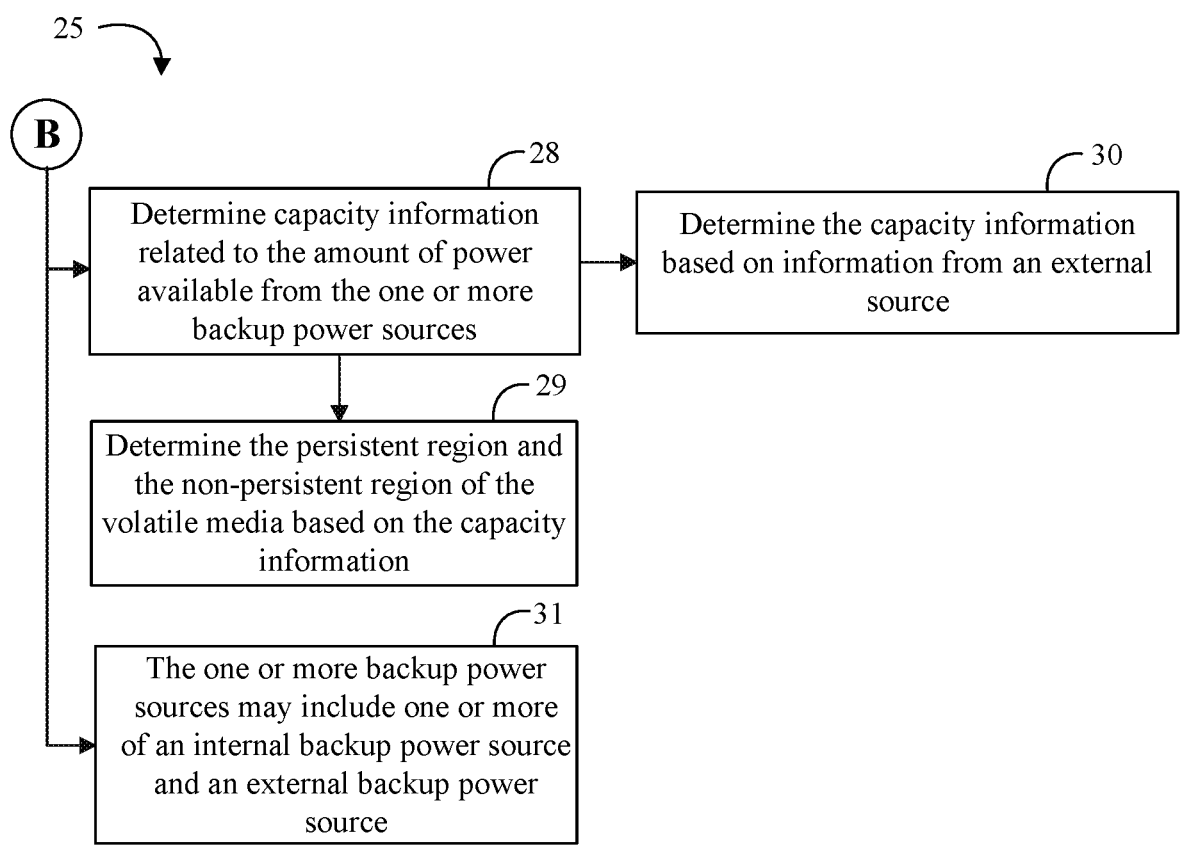
Figure 3C:
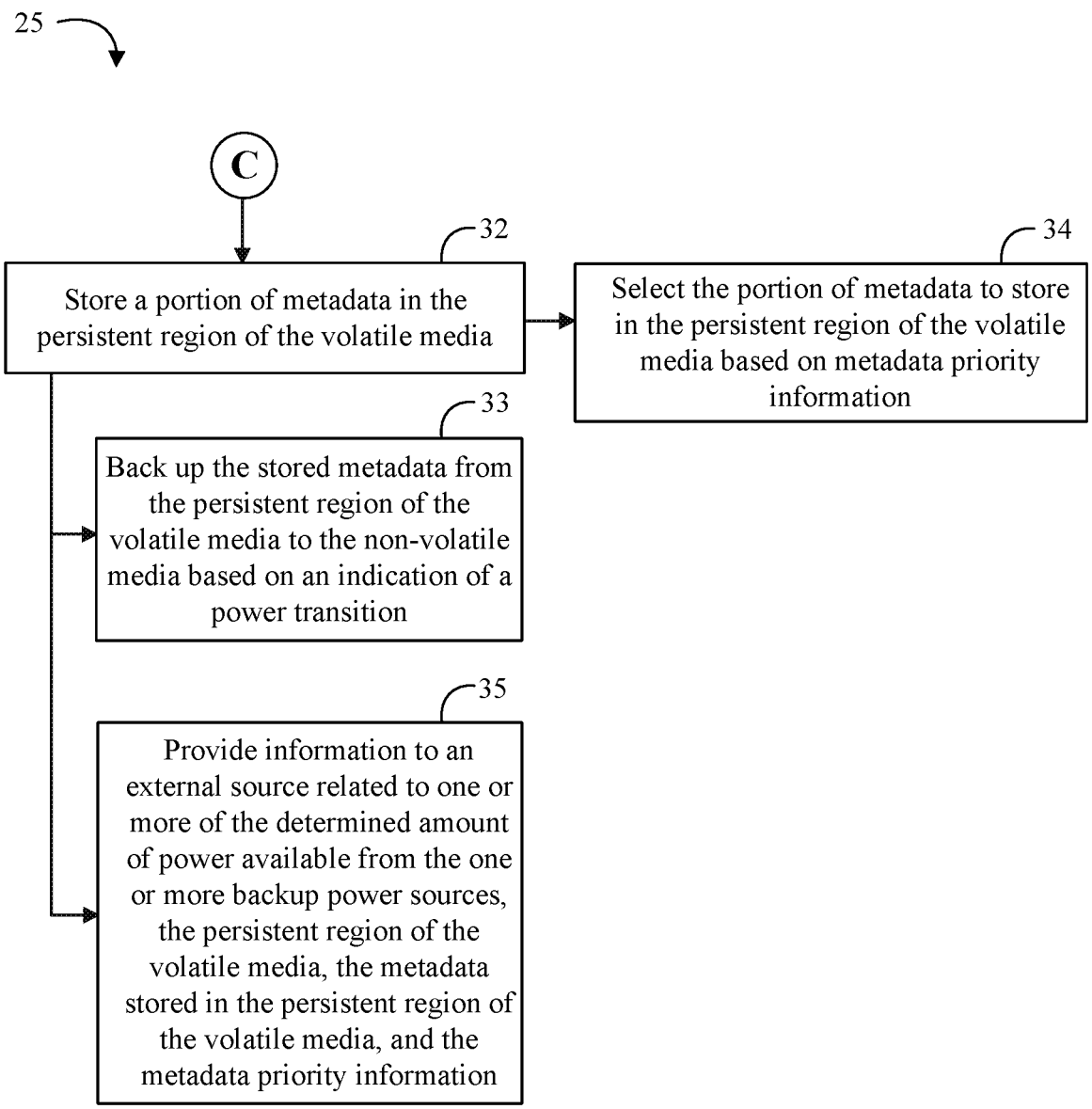

Turning now to FIGS. 3A to 3C, an embodiment of a method 25 of controlling storage may include determining a persistent region and a non-persistent region of a volatile media based on an amount of power available from one or more backup power sources at block 26, and periodically backing up only the non-persistent region of the volatile media to a non-volatile media at block 27. Some embodiments of the method 25 may further include determining capacity information related to the amount of power available from the one or more backup power sources at block 28, and determining the persistent region and the non-persistent region of the volatile media based on the capacity information at block 29. For example, the method 25 may also include determining the capacity information based on information from an external source at block 30. For example, the one or more backup power sources may include one or more of an internal backup power source and an external backup power source at block 31.

Some embodiments of the method 25 may further include storing a portion of metadata in the persistent region of the volatile media at block 32. For example, the method 25 may also include backing up the stored metadata from the persistent region of the volatile media to the non-volatile media based on an indication of a power transition at block 33. Some embodiments of the method 25 may include selecting the portion of metadata to store in the persistent region of the volatile media based on metadata priority information at block 34. Some embodiments of the method 25 may further include providing information to an external source related to one or more of the determined amount of power available from the one or more backup power sources, the persistent region of the volatile media, the metadata stored in the persistent region of the volatile media, and the metadata priority information at block 35.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 25 may be implemented on a computer readable medium as described in connection with Examples 26 to 33 below. Embodiments or portions of the method 25 may be implemented in firmware, applications (e.g., through an application programming interface (API)), or driver software running on an operating system (OS).

Figure 4:
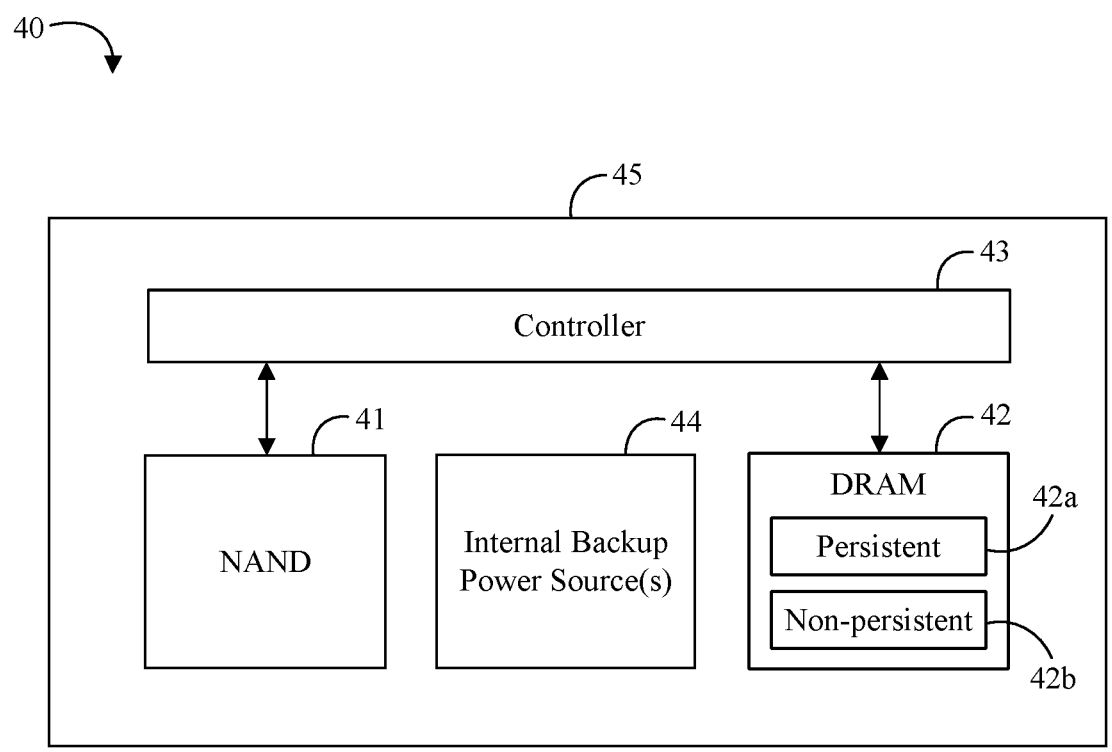
FIG. 4 is a block diagram of an example of a SSD according to an embodiment.

Turning now to FIG. 4, an embodiment of a SSD 40 may include NAND media 41, DRAM media 42, a controller 43, and an internal backup power source 44 all contained within a housing 45 of the SSD 40. The controller 43 may be configured to segment the DRAM media 42 into a persistent region 42a and a non-persistent region 42b. In some embodiments, the internal backup power source 44 may include one or more of a capacitor array, a rechargeable battery, and/or a replaceable battery. For example, the size of the persistent region 42a may be based on an amount of power available from the internal backup power source 44 during an unexpected power loss. In some embodiments, the internal backup power source 44 may also provide power to the controller 43, the NAND media 41, and other components of the SSD 40 during an unexpected power loss. Accordingly, the amount of power consumed by other components of the SSD 40 during an unexpected power loss may affect how much power is available to the DRAM media 42 (e.g., which may affect the size of the persistent region 42a).

In some embodiments, the size of the persistent region 42a may be fixed and based on a variety of worst case assumptions regarding power consumed by other components, power consumption of sequential writes from the DRAM media 42 to the NAND media 41, write speed, etc. In some embodiments, the size of the persistent region 42a may be configurable (e.g., based on test results and/or actual measurements for a particular SSD). In some embodiments, the size of the persistent region 42a may be dynamically determined based on onboard sensor measurements, the available cache capacity associated with the NAND media 41 (e.g., the amount of other data that may need to get backed up to the NAND media 41), and/or additional logic and measurements to determine how much of the DRAM media 42 may be safely backed up to the NAND media 41 at any given moment in the event of unexpected power loss.

Because the data stored in the persistent region 42a may be maintained in the event of an unexpected power loss, the controller 43 may advantageously periodically backup only the non-persistent region 42b of the DRAM media 42 to the NAND media 41. In some embodiments, the SSD 40 may be completely self-contained and any attached host may be unaware of the internal arrangement of the SSD 40. For example, the SSD 40 may only rely on the internal backup power source 44 and may not be configured to adjust the size of the persistent region 42a based on any extra power from an external backup power source. Some embodiments of the SSD 40 may utilize the persistent region 42a to store metadata associated with data stored in the NAND media 41. Depending on the size of the persistent region 42a, only a portion of the metadata may fit within the persistent region 42a, and the controller 43 may be configured to select a portion of metadata to store in the persistent region 42a based on metadata priority information. In the event of a controlled shutdown or an unexpected power loss, the controller 43 may be configured to copy the stored metadata from the persistent region 42a to the NAND media 41.

Embodiments of the controller 43, and other components of the SSD 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 5:
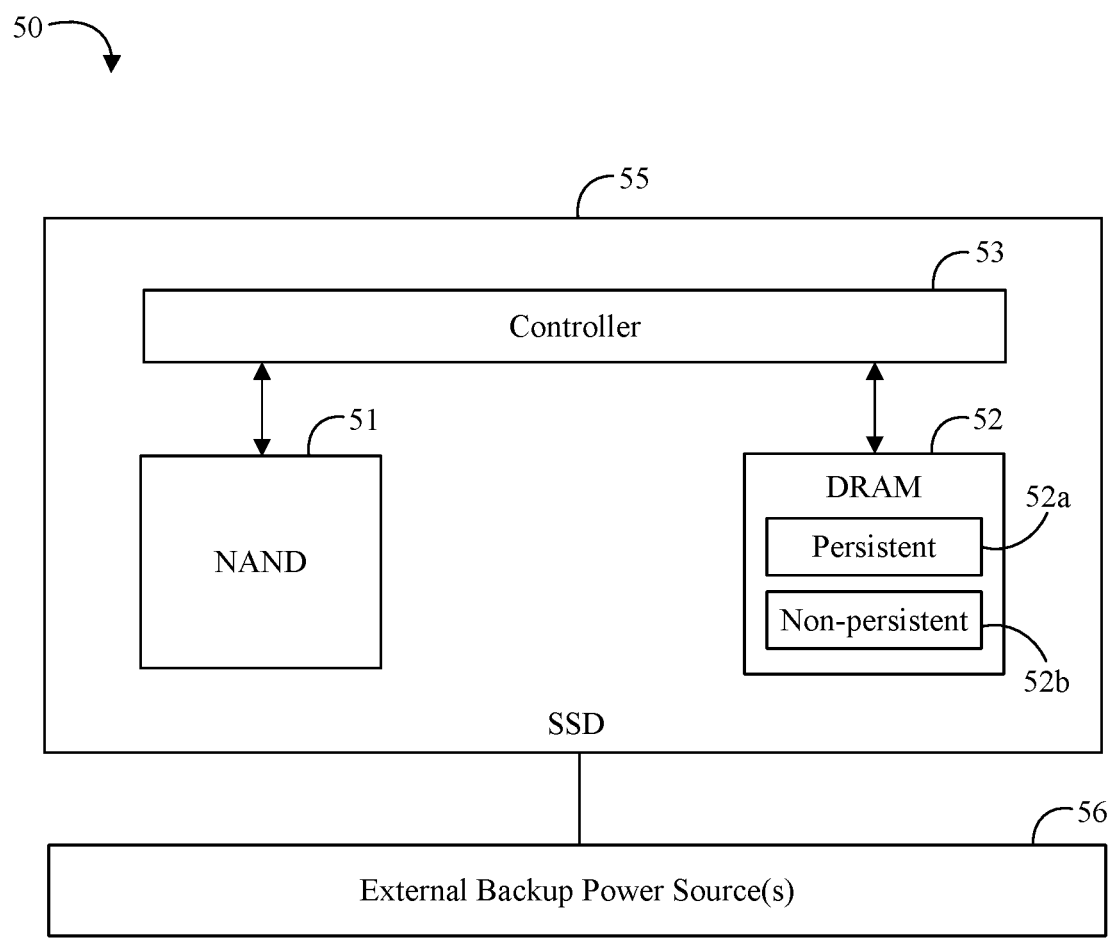
FIG. 5 is a block diagram of an example of a storage system according to an embodiment.

Turning now to FIG. 5, an embodiment of a storage system 50 may include NAND media 51, DRAM media 52, and a controller 53, all contained within a SSD 55 (e.g., within a housing of the SSD 55). The storage system 50 may further include one or more external backup power sources 56 outside the SSD 55 (e.g., outside the housing of the SSD 55) and coupled to the SSD 55 to provide backup power to one or more components inside the SSD 55, including at least the DRAM media 52. In some embodiments, the external backup power sources 56 may include one or more capacitor arrays, rechargeable batteries, and/or replaceable batteries. The controller 53 may be configured to segment the DRAM media 52 into a persistent region 52a and a non-persistent region 52b. For example, the size of the persistent region 52a may be based on an amount of power available from the external backup power sources 56 during an unexpected power loss. In some embodiments, the external backup power sources 56 may also provide power to the controller 53, the NAND media 51, and other components inside the SSD 55 during an unexpected power loss. Accordingly, the amount of power consumed by other components inside the SSD 55 during an unexpected power loss may affect how much power is available to the DRAM media 52 (e.g., which may affect the size of the persistent region 52a). In some embodiments, the external backup power sources 56 may be dedicated to the DRAM media 52 (e.g., and the SSD 55 may include one or more other internal/external backup power sources for other components of the SSD 55).

In some embodiments, the size of the persistent region 52a may be configurable (e.g., set by a user based on the type and amount of external backup power sources 56 connected to the SSD 55, based on test results and/or actual measurements for a particular storage system, etc.). In some embodiments, the size of the persistent region 52a may be dynamically determined based on information exchanged between the external backup power sources 56 and the controller 53, onboard sensor measurements (e.g., power consumed by other components, power consumption of sequential writes from the DRAM media 52 to the NAND media 51, write speed, etc.), the available cache capacity associated with the NAND media 51 (e.g., the amount of other data that may need to get backed up to the NAND media 51), and/or additional logic and measurements to determine how much of the DRAM media 52 may be safely backed up to the NAND media 51 at any given moment in the event of unexpected power loss.

Because the data stored in the persistent region 52a may be maintained in the event of an unexpected power loss, the controller 53 may advantageously periodically backup only the non-persistent region 52b of the DRAM media 52 to the NAND media 51. In some embodiments, the SSD 55 of the storage system 50 may lack an internal backup power source and may only rely on the external backup power source(s) 56. In some embodiments, an attached host may be unaware of the power arrangement of the system 50. Alternatively, an attached host may be aware of the capability of the storage system 50 to utilize external backup power sources and may provide additional backup power capacity for the storage system 50. For example, the controller 53 may be configured to adjust the size of the persistent region 52a based extra power from the one or more external backup power sources 56 (e.g., including host backup power sources). Some embodiments of the storage system 50 may utilize the persistent region 52a to store metadata associated with data stored in the NAND media 51. Depending on the size of the persistent region 52a, only a portion of the metadata may fit within the persistent region 52a, and the controller 53 may be configured to select a portion of metadata to store in the persistent region 52a based on metadata priority information. In the event of a controlled shutdown or an unexpected power loss, the controller 53 may be configured to copy the stored metadata from the persistent region 52a to the NAND media 51.

Embodiments of the controller 53, and other components of the system 50, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 6:
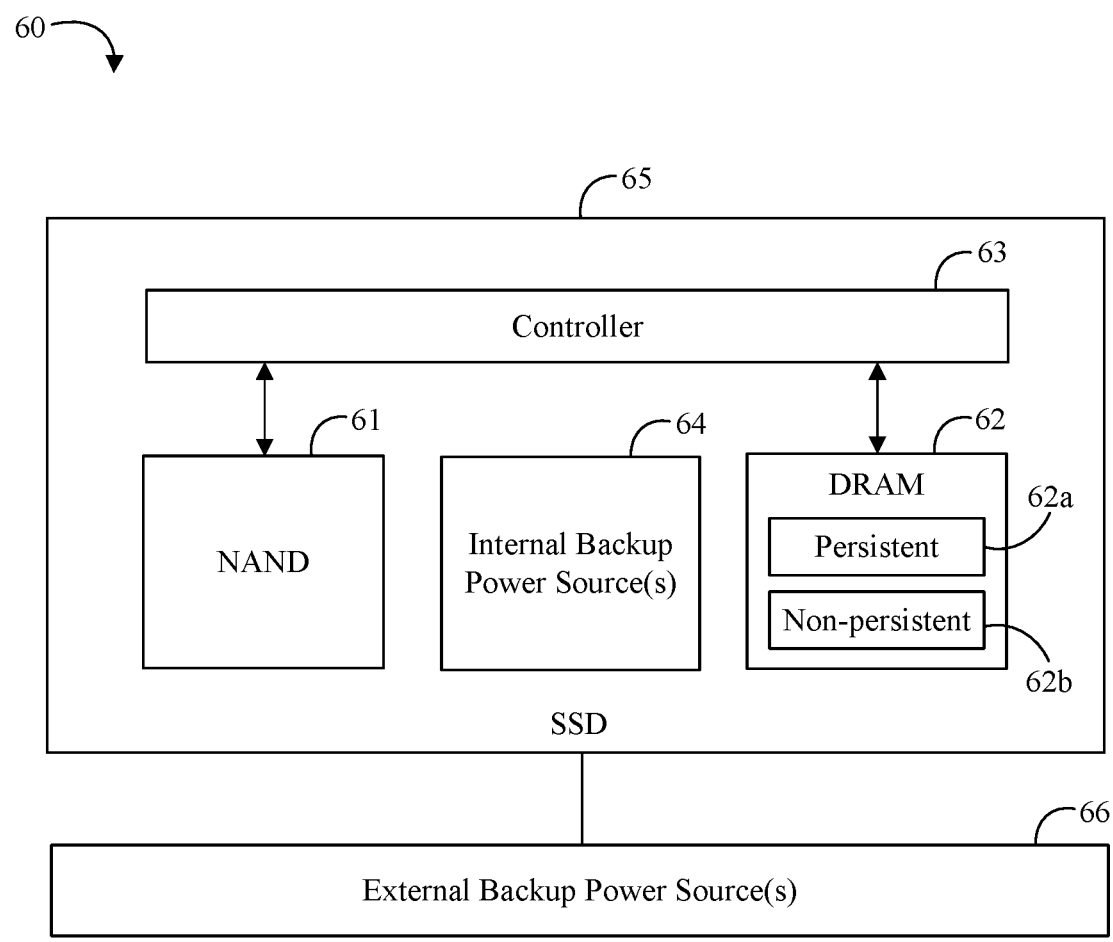
FIG. 6 is a block diagram of another example of a storage system according to an embodiment.

Turning now to FIG. 6, an embodiment of a storage system 60 may include NAND media 61, DRAM media 62, and a controller 63, and an internal backup power source 64, all contained within a SSD 65 (e.g., within a housing of the SSD 65). The storage system 60 may further include one or more external backup power sources 66 outside the SSD 65 (e.g., outside the housing of the SSD 65). In some embodiments, the internal backup power source 64 may include a capacitor array, while the external backup power sources 66 may include one or more capacitor arrays, rechargeable batteries, and/or replaceable batteries. The controller 63 may be configured to segment the DRAM media 62 into a persistent region 62a and a non-persistent region 62b. For example, the size of the persistent region 62a may be based on an amount of power available from both the internal and external backup power sources 64, 66 during an unexpected power loss. In some embodiments, one or more of the internal and external backup power sources 64, 66 may also provide power to the controller 63, the NAND media 61, and other components inside the SSD 65 during an unexpected power loss. Accordingly, the amount of power consumed by other components inside the SSD 65 during an unexpected power loss may affect how much power is available to the DRAM media 62 (e.g., which may affect the size of the persistent region 62a).

In some embodiments, the size of the persistent region 62a may be configurable (e.g., set by a user based on the type and amount of internal and external backup power sources 64, 66 connected to the SSD 65, based on test results and/or actual measurements for a particular storage system, etc.). In some embodiments, the size of the persistent region 62a may be dynamically determined based on information exchanged between the internal and external backup power sources 64, 66 and the controller 63, onboard sensor measurements (e.g., power consumed by other components, power consumption of sequential writes from the DRAM media 62 to the NAND media 61, write speed, etc.), the available cache capacity associated with the NAND media 61 (e.g., the amount of other data that may need to get backed up to the NAND media 61), and/or additional logic and measurements to determine how much of the DRAM media 62 may be safely backed up to the NAND media 61 at any given moment in the event of unexpected power loss.

Because the data stored in the persistent region 62a may be maintained in the event of an unexpected power loss, the controller 63 may advantageously periodically backup only the non-persistent region 62b of the DRAM media 62 to the NAND media 61. In some embodiments, an attached host may be aware of the capability of the storage system 60 to utilize external backup power sources and may provide additional backup power capacity for the storage system 60. For example, the controller 63 may be configured to adjust the size of the persistent region 62a based extra power from the one or more external backup power sources 66 (e.g., including host backup power sources). Some embodiments of the storage system 60 may utilize the persistent region 62a to store metadata associated with data stored in the NAND media 61. Depending on the size of the persistent region 62a, only a portion of the metadata may fit within the persistent region 62a, and the controller 63 may be configured to select a portion of metadata to store in the persistent region 62a based on metadata priority information. In the event of a controlled shutdown or an unexpected power loss, the controller 63 may be configured to copy the stored metadata from the persistent region 62a to the NAND media 61.

Embodiments of the controller 63, and other components of the system 60, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide technology to move SSD metadata into a DRAM non-volatile region with effectively infinite endurance. In order to maintain a correct internal state, including indirection information, a NAND-based SSD may include firmware to manage several types of metadata internally. For example, the firmware may maintain a context data structure that includes one or more of an indirection table (e.g., a logical to physical (L2P) translation table), a band invalidity table, a band erase table, open band information (e.g., open bands index and offset), drive parameters, and defect maps. In some other systems, all of the metadata may reside in volatile memory (e.g., SRAM or DRAM) of the SSD during runtime and may be backed up to the NAND flash periodically. The periodic backup of the metadata may cause lower quality of service (QoS) during a context drop. Concurrent context drops may improve QoS, but die congestion may still occur when two write streams (e.g., a context drop write stream and a host write steam) access the same die. The periodic backup of the metadata may also cause higher write amplification in some systems because bands may be reserved for context and power loss imminent (PLI) drops (e.g., which may reduce the over-provisioning). Maintaining the metadata in volatile memory may cause slower startup times after a power-failure, because the latest metadata needs to be recovered from the last saved context and other information on disk (e.g., the most recent context in the volatile may not be properly saved during the power failure).

Some other systems may provide a hybrid SSD with NAND media and a 3D crosspoint memory to maintain the context. However, utilizing the 3D crosspoint memory may increase the complexity of the controller and/or SSD firmware. In some systems, the 3D crosspoint memory may have limited endurance (e.g., particularly due to frequent metadata updates) which may affect the SSD lifetime. Some embodiments may advantageously make a partial region (e.g., or all) of the SSD DRAM effectively non-volatile by using extra energy provided by the host and/or by an on-board SSD battery/capacitors (e.g., with little or no change to the SSD controller). Depending on the size of the non-volatile region of DRAM, most or all of the metadata may no longer need to be backed up by the NAND flash periodically. Instead, the protected metadata may be saved during a power cycle. If more metadata is needed than fits in the non-volatile region, extra energy may be provided (e.g., requested from the user/host) or any suitable paging technology may be utilized for metadata paging (e.g., to mitigate problems due to metadata backup, unexpected power loss, etc.).

Some embodiments may advantageously provide a storage device/system with improved QoS. Some embodiments may also advantageously provide reduced write amplification (WA), for example, because the SSD may no longer need the extra bands for context and PLI drop. In some embodiments, the data in the DRAM non-volatile region may be dropped into open host bands and/or garbage collection/defragmentation bands. In some embodiments, the physical location for the data in the DRAM non-volatile region may be saved into the existing single level cell (SLC) system bands. Advantageously, the reduced WA may directly improve the SSD's performance and endurance. Alternatively, some embodiments may advantageously provide more user capacity with the same over-provisioning (e.g., or write amplification), effectively reducing the cost per gigabyte (GB).

Figure 7:
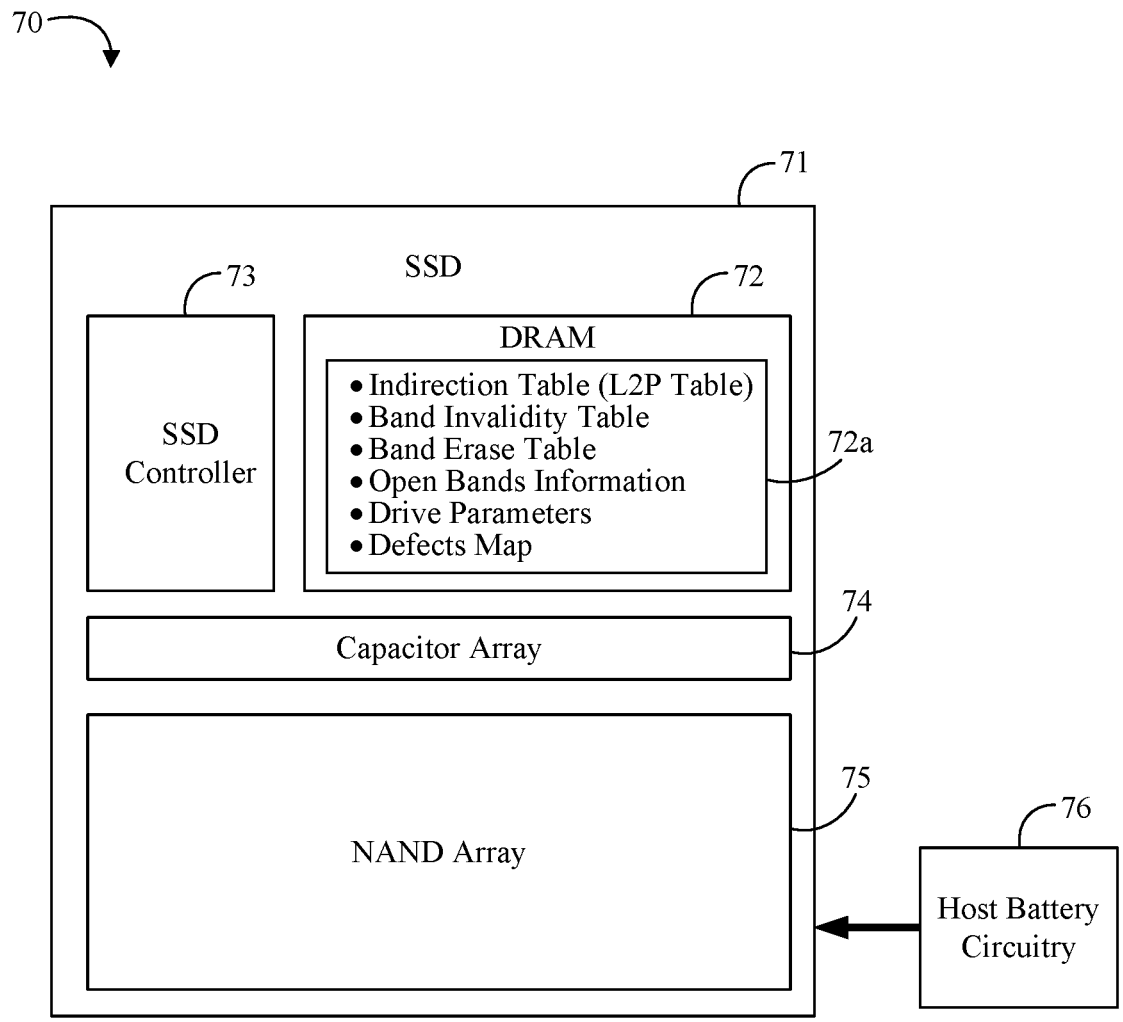
FIG. 7 is a block diagram of another example of a storage system according to an embodiment.

Turning now to FIG. 7, an embodiment of a storage system 70 may include a SSD 71 including a DRAM 72 with a non-volatile memory region 72a. The SSD 71 may also include a SSD controller 73, a capacitor array 74, and a NAND array 75 (e.g., all contained within a housing of the SSD 71). The system 70 may further include host battery circuitry 76 communicatively coupled to the SSD 71. Depending on how much energy may be provided by the SSD capacitor array 74 or/and the host battery 76 during a power loss scenario, partial or all of the SSD DRAM may be made effectively non-volatile to provide the non-volatile memory region 72a. Depending on the available capacity of the SSD DRAM non-volatile region 72a, partial or all of the SSD metadata may no longer need to be backed up periodically by the NAND array 75, which may advantageously improve QoS of the SSD 71, and may better utilize capacity of the NAND array 75.

In some embodiments, technology may be provided to flush partial or all of the data in the DRAM 72 to the NAND array 75 during a power cycle and a surprise power loss. With the flush technology, the data resident in the non-volatile region 72a may be considered essentially non-volatile with substantially infinite endurance (e.g., there is no wear from reads/writes to the DRAM 72). For a normal power cycle (e.g., a safe shutdown), the SSD 71 may always backup the entire/dirty data in the DRAM 72 to the NAND array 75.

In some embodiments, the size of the DRAM non-volatile memory region 72a may depend on the energy that may be provided by the SSD and/or the host battery circuitry 76 during a surprise power loss. For example, the size of the non-voaltile memory region 72a may vary from a few megabytes (MBs) to the entire capacity of the DRAM 72. In some embodiments, the capacitor array 74 installed the SSD 71 may support up to about a one hundred megabyte (100 MB) data transfer from the DRAM 72 to the NAND array 75 during a surprise power loss. If the host can provide an additional 20 watts power for about 2 seconds of energy (e.g., by using the host battery circuit 76) during the surprise power loss, the non-volatile region 72a may be increased to about four gigabytes (4 GB) (e.g., assuming a 2 GB/second transfer speed).

Some embodiments may include metadata management. For example, because the size of the region 72a may vary depending on the available energy, all of the needed/desired metadata may not fit in the region at all times. Some embodiments may prioritize which metadata is stored in the region 72a. For example, some embodiments may first select band information, including the band invalidity table, the band erase table, open bands information (e.g., index and offset), etc. The band information metadata structure may consume the least capacity (e.g., a few KB), but may be important/critical components for some embodiments of a functional SSD. Some embodiments may select drive parameters, including host write counts, NAND write counts, temperature, etc., for the next priority. For example, the drive parameter metadata may consume less than 1 MB. Some embodiments may select defect maps for the next priority. The defect maps metadata data structure may consume a few MB, but may be updated less frequently (e.g., as compared to the higher priority metadata). Some embodiments may select the indirection table (e.g., L2P table) for lower priority. Although the indirection table is updated very frequently (e.g., for every host write/trim, or SSD defrag operation), the indirection table may consume a significant portion of the SSD DRAM (e.g., about 0.1% of the entire SSD logical capacity for a 4 KB indirection unit, in some embodiments). If a portion of metadata does not fit into the effectively non-volatile DRAM region 72a, then metadata paging and/or write-back caching may be utilized to store the metadata, with the non-volatile memory region 72a serving as the cache, and the NAND array 75 serving as the backend. Any suitable paging/caching technology may be utilized for such metadata paging and/or write-back caching.

ADDITIONAL NOTES AND EXAMPLES

Example 1 may include a storage system, comprising non-volatile media, volatile media, one or more backup power sources communicatively coupled to the non-volatile media and the volatile media, and logic communicatively coupled to the non-volatile media, the volatile media, and the one or more backup power sources to determine a persistent region and a non-persistent region of the volatile media based on an amount of power available from the one or more backup power sources, and periodically backup only the non-persistent region of the volatile media to the non-volatile media.

Example 2 may include the system of Example 1, wherein the logic is further to determine capacity information related to the amount of power available from the one or more backup power sources, and determine the persistent region and the non-persistent region of the volatile media based on the capacity information.

Example 3 may include the system of Example 2, wherein the logic is further to determine the capacity information based on information from an external source.

Example 4 may include the system of Example 1, wherein the logic is further to store a portion of metadata in the persistent region of the volatile media.

Example 5 may include the system of Example 4, wherein the logic is further to backup the stored metadata from the persistent region of the volatile media to the non-volatile media based on an indication of a power transition.

Example 6 may include the system of Example 4, wherein the logic is further to select the portion of metadata to store in the persistent region of the volatile media based on metadata priority information.

Example 7 may include the system of Example 6, wherein the logic is further to provide information to an external source related to one or more of the determined amount of power available from the one or more backup power sources, the persistent region of the volatile media, the metadata stored in the persistent region of the volatile media, and the metadata priority information.

Example 8 may include the system of any of Examples 1 to 7, wherein the one or more backup power sources includes one or more of an internal backup power source and an external backup power source.

Example 9 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to determine a persistent region and a non-persistent region of a volatile media based on an amount of power available from one or more backup power sources, and periodically backup only the non-persistent region of the volatile media to a non-volatile media.

Example 10 may include the apparatus of Example 9, wherein the logic is further to determine capacity information related to the amount of power available from the one or more backup power sources, and determine the persistent region and the non-persistent region of the volatile media based on the capacity information.

Example 11 may include the apparatus of Example 10, wherein the logic is further to determine the capacity information based on information from an external source.

Example 12 may include the apparatus of Example 9, wherein the logic is further to store a portion of metadata in the persistent region of the volatile media.

Example 13 may include the apparatus of Example 12, wherein the logic is further to backup the stored metadata from the persistent region of the volatile media to the non-volatile media based on an indication of a power transition.

Example 14 may include the apparatus of Example 12, wherein the logic is further to select the portion of metadata to store in the persistent region of the volatile media based on metadata priority information.

Example 15 may include the apparatus of Example 14, wherein the logic is further to provide information to an external source related to one or more of the determined amount of power available from the one or more backup power sources, the persistent region of the volatile media, the metadata stored in the persistent region of the volatile media, and the metadata priority information.

Example 16 may include the apparatus of any of Examples 9 to 15, wherein the one or more backup power sources includes one or more of an internal backup power source and an external backup power source.

Example 17 may include the apparatus of any of Examples 9 to 15, wherein the logic coupled to the one or more substrates includes transistor channel regions that are positioned within the one or more substrates.

Example 18 may include a method of controlling storage, comprising determining a persistent region and a non-persistent region of a volatile media based on an amount of power available from one or more backup power sources, and periodically backing up only the non-persistent region of the volatile media to a non-volatile media.

Example 19 may include the method of Example 18, further comprising determining capacity information related to the amount of power available from the one or more backup power sources, and determining the persistent region and the non-persistent region of the volatile media based on the capacity information.

Example 20 may include the method of Example 19, further comprising determining the capacity information based on information from an external source.

Example 21 may include the method of Example 18, further comprising storing a portion of metadata in the persistent region of the volatile media.

Example 22 may include the method of Example 21, further comprising backing up the stored metadata from the persistent region of the volatile media to the non-volatile media based on an indication of a power transition.

Example 23 may include the method of Example 21, further comprising selecting the portion of metadata to store in the persistent region of the volatile media based on metadata priority information.

Example 24 may include the method of Example 23, further comprising providing information to an external source related to one or more of the determined amount of power available from the one or more backup power sources, the persistent region of the volatile media, the metadata stored in the persistent region of the volatile media, and the metadata priority information.

Example 25 may include the method of any of Examples 18 to 24, wherein the one or more backup power sources includes one or more of an internal backup power source and an external backup power source.

Example 26 may include at least one computer readable medium, comprising a set of instructions, which when executed by a computing device, cause the computing device to determine a persistent region and a non-persistent region of a volatile media based on an amount of power available from one or more backup power sources, and periodically backup only the non-persistent region of the volatile media to a non-volatile media.

Example 27 may include the at least one computer readable medium of Example 26, comprising a further set of instructions, which when executed by the computing device, cause the computing device to determine capacity information related to the amount of power available from the one or more backup power sources, and determine the persistent region and the non-persistent region of the volatile media based on the capacity information.

Example 28 may include the at least one computer readable medium of Example 27, comprising a further set of instructions, which when executed by the computing device, cause the computing device to determine the capacity information based on information from an external source.

Example 29 may include the at least one computer readable medium of Example 26, comprising a further set of instructions, which when executed by the computing device, cause the computing device to store a portion of metadata in the persistent region of the volatile media.

Example 30 may include the at least one computer readable medium of Example 29, comprising a further set of instructions, which when executed by the computing device, cause the computing device to backup the stored metadata from the persistent region of the volatile media to the non-volatile media based on an indication of a power transition.

Example 31 may include the at least one computer readable medium of Example 29, comprising a further set of instructions, which when executed by the computing device, cause the computing device to select the portion of metadata to store in the persistent region of the volatile media based on metadata priority information.

Example 32 may include the at least one computer readable medium of Example 31, comprising a further set of instructions, which when executed by the computing device, cause the computing device to provide information to an external source related to one or more of the determined amount of power available from the one or more backup power sources, the persistent region of the volatile media, the metadata stored in the persistent region of the volatile media, and the metadata priority information.

Example 33 may include the at least one computer readable medium of any of Examples 26 to 32, wherein the one or more backup power sources includes one or more of an internal backup power source and an external backup power source.

Example 34 may include a storage controller apparatus, comprising means for determining a persistent region and a non-persistent region of a volatile media based on an amount of power available from one or more backup power sources, and means for periodically backing up only the non-persistent region of the volatile media to a non-volatile media.

Example 35 may include the apparatus of Example 34, further comprising means for determining capacity information related to the amount of power available from the one or more backup power sources, and means for determining the persistent region and the non-persistent region of the volatile media based on the capacity information.

Example 36 may include the apparatus of Example 35, further comprising means for determining the capacity information based on information from an external source.

Example 37 may include the apparatus of Example 34, further comprising means for storing a portion of metadata in the persistent region of the volatile media.

Example 38 may include the apparatus of Example 37, further comprising means for backing up the stored metadata from the persistent region of the volatile media to the non-volatile media based on an indication of a power transition.

Example 39 may include the apparatus of Example 37, further comprising means for selecting the portion of metadata to store in the persistent region of the volatile media based on metadata priority information.

Example 40 may include the apparatus of Example 39, further comprising means for providing information to an external source related to one or more of the determined amount of power available from the one or more backup power sources, the persistent region of the volatile media, the metadata stored in the persistent region of the volatile media, and the metadata priority information.

Example 41 may include the apparatus of any of Examples 34 to 40, wherein the one or more backup power sources includes one or more of an internal backup power source and an external backup power source.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A storage system, comprising: non-volatile media; volatile media; one or more backup power sources communicatively coupled to the non-volatile media and the volatile media; and logic communicatively coupled to the non-volatile media, the volatile media, and the one or more backup power sources to: determine a persistent region and a non-persistent region of the volatile media, wherein the determination of the persistent region includes dynamically adjusting a size of the persistent region based on an amount of power available from the one or more backup power sources and based on an available cache capacity associated with the non-volatile media, wherein the volatile media is a dynamic random access memory of a solid state drive, and wherein the persistent region is a region of the dynamic random access memory that is maintained by the backup power source in an event of an unexpected power loss, and periodically backup only the non-persistent region of the volatile media to the non-volatile media of the solid state drive.

2. The storage system of claim 1, wherein the logic is further to:
determine capacity information related to the amount of power available from the one or more backup power sources, and
determine the persistent region and the non-persistent region of the volatile media based on the capacity information.

3. The storage system of claim 2, wherein the logic is further to:
determine the capacity information based on information from an external source.

4. The storage system of claim 1, wherein the logic is further to:
store a portion of metadata in the persistent region of the volatile media.

5. The storage system of claim 4, wherein the logic is further to:
backup the stored portion of metadata from the persistent region of the volatile media to the non-volatile media based on an indication of a power transition.

6. The storage system of claim 4, wherein the logic is further to:
select the portion of metadata to store in the persistent region of the volatile media based on metadata priority information.

7. The storage system of claim 6, wherein the logic is further to:
provide information to an external source related to one or more of the determined amount of power available from the one or more backup power sources, the persistent region of the volatile media, the portion of metadata stored in the persistent region of the volatile media, and the metadata priority information.

8. The storage system of claim 1, wherein the one or more backup power sources includes one or more of an internal backup power source and an external backup power source.

9. A semiconductor apparatus, comprising: one or more substrates; and
logic coupled to the one or more substrates, wherein the logic is at least partly implemented in one or more of configurable logic and fixed-functionality hardware logic, the logic coupled to the one or more substrates to:
determine a persistent region and a non-persistent region of a volatile media, wherein the determination of the persistent region includes dynamically adjusting a size of the persistent region based on an amount of power available from one or more backup power sources and based on an available cache capacity associated with a non-volatile media, wherein the volatile media is a dynamic random access memory of a solid state drive, wherein the persistent region is a region of the dynamic random access memory that is maintained by at least one of the one or more backup power sources in an event of an unexpected power loss, and periodically backup only the non-persistent region of the volatile media to a non-volatile media of the solid state drive.

10. The semiconductor apparatus of claim 9, wherein the logic is further to:

determine capacity information related to the amount of power available from the one or more backup power sources, and determine the persistent region and the non-persistent region of the volatile media based on the capacity information.

11. The semiconductor apparatus of claim 10, wherein the logic is further to:

determine the capacity information based on information from an external source.

12. The semiconductor apparatus of claim 9, wherein the logic is further to:

store a portion of metadata in the persistent region of the volatile media.

13. The semiconductor apparatus of claim 12, wherein the logic is further to:

backup the stored portion of metadata from the persistent region of the volatile media to the non-volatile media based on an indication of a power transition.

14. The semiconductor apparatus of claim 12, wherein the logic is further to:

select the portion of metadata to store in the persistent region of the volatile media based on metadata priority information.

15. The semiconductor apparatus of claim 14, wherein the logic is further to:

provide information to an external source related to one or more of the determined amount of power available from the one or more backup power sources, the persistent region of the volatile media, the portion of metadata stored in the persistent region of the volatile media, and the metadata priority information.

16. The semiconductor apparatus of claim 9, wherein the one or more backup power sources includes one or more of an internal backup power source and an external backup power source.

17. The semiconductor apparatus of claim 9, wherein the logic coupled to the one or more substrates includes transistor channel regions that are positioned within the one or more substrates.

18. A method of controlling storage, comprising: determining a persistent region and a non-persistent region of a volatile media, wherein the determination of the persistent region includes dynamically adjusting a size of the persistent region based on an amount of power available from one or more backup power sources and based on an available cache capacity associated with a non-volatile media, wherein the volatile media is a dynamic random access memory of a solid state drive, wherein the persistent region is a region of the dynamic random access memory that is maintained by at least one of the one or more backup power sources in an event of an unexpected power loss; and periodically backing up only the non-persistent region of the volatile media to a non-volatile media of the solid state drive.

19. The method of claim 18, further comprising:

determining capacity information related to the amount of power available from the one or more backup power sources, and determining the persistent region and the non-persistent region of the volatile media based on the capacity information.

20. The method of claim 19, further comprising:

determining the capacity information based on information from an external source.

21. The method of claim 18, further comprising:

storing a portion of metadata in the persistent region of the volatile media.

22. The method of claim 21, further comprising:

backing up the stored portion of metadata from the persistent region of the volatile media to the non-volatile media based on an indication of a power transition.

23. The method of claim 21, further comprising:

selecting the portion of metadata to store in the persistent region of the volatile media based on metadata priority information.

24. The method of claim 23, further comprising:

providing information to an external source related to one or more of the determined amount of power available from the one or more backup power sources, the persistent region of the volatile media, the portion of metadata stored in the persistent region of the volatile media, and the metadata priority information.

25. The method of claim 18, wherein the one or more backup power sources includes one or more of an internal backup power source and an external backup power source.

* * * * *